US012244011B2

(12) United States Patent
Mo et al.

(10) Patent No.: US 12,244,011 B2
(45) Date of Patent: Mar. 4, 2025

(54) MODIFIED HIGH-NICKEL CATHODE MATERIAL AND PREPARATION METHOD THEREOF

(71) Applicant: BASF SHANSHAN BATTERY MATERIALS CO., LTD., Changsha (CN)

(72) Inventors: Mengxia Mo, Changsha (CN); Haiyang Yu, Changsha (CN); Bo Tang, Changsha (CN); Guishi Han, Changsha (CN)

(73) Assignee: BASF SHANSHAN BATTERY MATERIALS CO., LTD., Changsha (CN)

( * ) Notice: Subject to any disclaimer, the term of this patent is extended or adjusted under 35 U.S.C. 154(b) by 4 days.

(21) Appl. No.: 18/005,965

(22) PCT Filed: Jun. 29, 2021

(86) PCT No.: PCT/CN2021/103022
§ 371 (c)(1),
(2) Date: Jan. 18, 2023

(87) PCT Pub. No.: WO2022/022198
PCT Pub. Date: Feb. 3, 2022

(65) Prior Publication Data
US 2023/0327102 A1    Oct. 12, 2023

(30) Foreign Application Priority Data

Jul. 30, 2020  (CN) .......................... 202010748864.7

(51) Int. Cl.
*H01M 4/525* (2010.01)
*C01G 53/42* (2025.01)
*H01M 4/58* (2010.01)
*H01M 4/02* (2006.01)

(52) U.S. Cl.
CPC ............ *H01M 4/525* (2013.01); *C01G 53/42* (2013.01); *H01M 4/5825* (2013.01);
(Continued)

(58) Field of Classification Search
CPC ..... H01M 4/52; H01M 4/525; C01P 2002/08; C01P 2002/60; C01P 2002/90; C01P 2004/32
See application file for complete search history.

(56) References Cited

FOREIGN PATENT DOCUMENTS

| CN | 103199229 A | 7/2013 |
|---|---|---|
| CN | 103500831 A | 1/2014 |

(Continued)

OTHER PUBLICATIONS

Li et al., Stabilizing LiNi0.8Co0.15Mn0.05O2 Cathode by Doping Sulfate for Lithium-Ion Batteries, Chem Sus Chem 2021, 14, 1-11. (Available online Apr. 27, 2021) (Year: 2021).*

(Continued)

*Primary Examiner* — Hoa Le
(74) *Attorney, Agent, or Firm* — Nitin Kaushik

(57) ABSTRACT

The present disclosure discloses a modified high-nickel cathode material, where the modified high-nickel cathode material is a $SO_4^{2-}$-doped modified high-nickel cathode material, and $SO_4^{2-}$ is distributed in a secondary particle with a content gradient from high inside to low outside. A preparation method of the modified high-nickel cathode material includes: mixing a high-nickel cathode material, a lithium source, and a sulfate, and sintering a resulting mixture to obtain a matrix material; and water-washing and drying the matrix material to obtain the modified high-nickel cathode material. The present disclosure increases a migration rate of lithium ions in the material and greatly improves the initial capacity of the material, which reduces an energy barrier for migration of lithium ions, increases a migration (Continued)

rate of lithium ions among primary particles of the material, and improves the safety performance of the material.

14 Claims, 8 Drawing Sheets

(52) U.S. Cl.
CPC ...... *C01P 2002/52* (2013.01); *C01P 2002/72* (2013.01); *C01P 2002/77* (2013.01); *C01P 2002/85* (2013.01); *C01P 2004/03* (2013.01); *C01P 2004/32* (2013.01); *C01P 2006/40* (2013.01); *H01M 2004/028* (2013.01)

(56) References Cited

FOREIGN PATENT DOCUMENTS

| CN | 108417791 A | 8/2018 |
|---|---|---|
| CN | 109616658 A | 4/2019 |
| JP | 2010080394 A | 4/2010 |

OTHER PUBLICATIONS

Song et al., Research Progress on the Surface of High-Nickel Nickel—Cobalt—Manganese Ternary Cathode Materials: A Mini Review, FRONTIERS in Chemisty, Aug. 2020, vol. 8, Article 761 (Year: 2020).*

Savina et al., Sulfate-Containing Composite Based on Ni-Rich Layered Oxide LiNi0.8Mn0.1Co0.1O2 as High-Performance Cathode Material for Li-ion Batteries, Nanomaterials 2020, 10, 2381; doi: 10.3390/nano10122381 (Year: 2020).*

Ban et al., Electrochemical performance improvement of Li1.2[Mn0.54Ni0.13Co0.13]O2 cathode material by sulfur incorporation, Electrochimica Acta 180 (2015) 218-226 (Year: 2015).*

Sun et al., A facile gaseous sulfur treatment strategy for Li-rich and Ni-rich cathode materials with high cycling and rate performance, Nano Energy 63 (2019) 103887.*

* cited by examiner

MODIFIED HIGH-NICKEL CATHODE MATERIAL AND PREPARATION METHOD THEREOF

CROSS-REFERENCE TO RELATED APPLICATIONS

The application claims priority to Chinese patent application No. 202010748864.7, filed on Jul. 30, 2020, the entire contents of which are incorporated herein by reference.

TECHNICAL FIELD

The present disclosure belongs to the field of cathode materials for lithium-ion batteries (LIBs), and in particular relates to a modified high-nickel cathode material and a preparation method thereof.

BACKGROUND

LIBs are environmentally-friendly energy storage batteries, which can be used in 3C products, electric tools, new energy vehicles, and other fields. As a main active material, a cathode material plays a very important role in an LIB. Cathode materials include lithium manganese oxide (LMO), lithium nickel oxide (LNO), lithium cobalt oxide (LCO), high-nickel ternary materials, lithium iron phosphate (LFP), and the like. As the requirements on the energy density of LIBs are further increased, the high-nickel ternary cathode materials have become one of the research hotspots.

A high-nickel ternary cathode material is a typical R-3m layered structural material including Ni, Co, and M (M is Al or Mn), where Ni provides a high energy density, Co inhibits the cation disordering, and Al/Mn improves the safety and structural stability of a material. When an LIB is charged, $Li^+$ is released from a positive electrode structure into an electrolyte and enters a negative electrode through a separator; and when an LIB is discharged, $Li^+$ is deintercalated from an anode material and is intercalated to an active site of a Li layer in a cathode active material through a reverse reaction.

However, the current high-nickel cathode materials generally have low capacity and poor safety performance, which limits the application of the high-nickel cathode materials, Therefore, it is necessary to modify the high-nickel cathode materials. The patent CN 109616658A discloses a high-nickel cathode material co-doped with selenium and a sulfate, and a preparation method and use thereof, Although a synergistic effect of selenium doping and sulfate anion doping can improve the capacity and rate performance of a cathode material for an LIB, this method still has some limitations, and thus the electrochemical performance of the cathode material can be further improved.

SUMMARY

The technical problem to be solved by the present disclosure: A modified high-nickel cathode material with high capacity and excellent safety performance and a preparation method thereof are provided to overcome the deficiencies and shortcomings mentioned in the above background art.

In order to solve the above technical problem, the present disclosure provides the following technical solutions:

A modified high-nickel cathode material is provided, where the modified high-nickel cathode material is a $SO_4^{2-}$-doped modified high-nickel cathode material, and $SO_4^{2-}$ is distributed in a secondary particle of the modified high-nickel cathode material with a content gradient from high inside to low outside.

In the modified high-nickel cathode material, preferably, the secondary particle of the modified high-nickel cathode material is spherical; and a $SO_4^{2-}$ content in a spherical region of L<0.6 R is 60% to 80% of a $SO_4^{2-}$ content in the entire secondary particle and a $SO_4^{2-}$ content in an annular region of 0.6 R≤L≤R is 20% to 40% of the $SO_4^{2-}$ content in the entire secondary particle, wherein R represents a radius of the spherical secondary particle and L represents a distance from a center of the spherical secondary particle.

In the modified high-nickel cathode material, preferably, the modified high-nickel cathode material has a chemical formula of $Li_xNi_yCo_{(1-y-z)}M_zS_yO_2$, where 0.98≤x≤1.1, 0.8≤y≤1, 0≤z≤0.2, 0.003≤y≤0.015, and M is Al or Mn.

In the modified high-nickel cathode material, preferably, the modified high-nickel cathode material has a unit cell size of 150 nm to 200 nm.

As a general inventive concept, the present disclosure also provides a preparation method of the modified high-nickel cathode material, including the following steps:

(1) mixing a high-nickel cathode material precursor, a lithium source, and a sulfate, and sintering a resulting mixture to obtain a matrix material; and (2) water-washing and drying the matrix material to obtain the modified high-nickel cathode material.

In the preparation method, preferably, in step (1), an addition amount of the sulfate is calculated based on $SO_4^{2-}$, and a mass of the $SO_4^{2-}$ is 0.5% to 2.7% of a total mass of the mixture.

In the preparation method, preferably, in step (1), the sulfate is one or more selected from the group consisting of nickel sulfate, cobalt sulfate, aluminum sulfate, lithium sulfate, sodium sulfate, and ammonium sulfate.

In the preparation method, preferably, in step (1), the sintering is conducted at 600° C. to 900'° C. for 3 h to 20 h.

In the preparation method, preferably, in step (2), during the water-washing, a mass ratio of the matrix material to deionized water is (1:0.5) to (1:5); and the water-washing is conducted for 20 mini to 40 min.

Compared with the prior art, the present disclosure has the following advantages:

(1) In the $SO_4^{2-}$-doped modified high-nickel cathode material of the present disclosure, $SO_4^{2-}$ is distributed in a secondary particle with a content gradient from high inside to low outside. Thus, there are many O—S—O bonds and cations inside that attract each other, which plays the role of stabilizing a structure, increases a migration rate of lithium ions in the material, and greatly improves the initial capacity of the material; and the low $SO_4^{2-}$ content outside corresponds to a low inactive lithium substance content, which reduces an energy barrier for migration of lithium ions among primary particles, increases a migration rite of lithium ions among primary particles of the material to further improve the initial capacity, and reduces the side reactions between $Li_2SO_4$ and an electrolyte to improve the safety performance of the material.

(2) In the preparation method of the present disclosure, the $SO_4^{2-}$-doped material is washed with water to reduce a $SO_4^{2-}$ content on a surface of the secondary particle, such that $SO_4^{2-}$ is distributed in the secondary particle with a content gradient from high inside to low outside. The internal O—S—O bonds and cations attract each other to play the role of stabilizing a structure. In particular, $Li^+$ binds to $SO_4^{2-}$ to produce a fast ion conductor lithium sulfate, and the fast ion conductor is distributed inside the material, which improves a migration rate of lithium ions inside the material and greatly increases the initial capacity.

(3) In the preparation method of the present disclosure, after the material is washed with water, lithium sulfate on the surface of the secondary particle is washed off, a specific surface area (SSA) is increased, contact sites of the material with an electrolyte are increased, and the migration of lithium ions is accelerated, which further improves the initial capacity. In addition, after the water-washing, a $SO_4^{2-}$ content on the surface is greatly reduced to form a structure with a $SO_4^{2-}$ content decreasing from inside to outside, which enables both prominent capacity and excellent safety performance.

(4) In the modified high-nickel cathode material of the present disclosure, a large amount of $SO_4^{2-}$ is doped through single sintering to reduce the lithium ion occupancy while reducing a unit cell size, such that lithium vacancies are increased, an energy barrier for migration of lithium ions is reduced, and lithium ions are more likely to be intercalated into and deintercalated from a structure, thereby increasing a reversible capacity of the material.

DETAILED DESCRIPTION OF THE EMBODIMENTS

Figure 1:
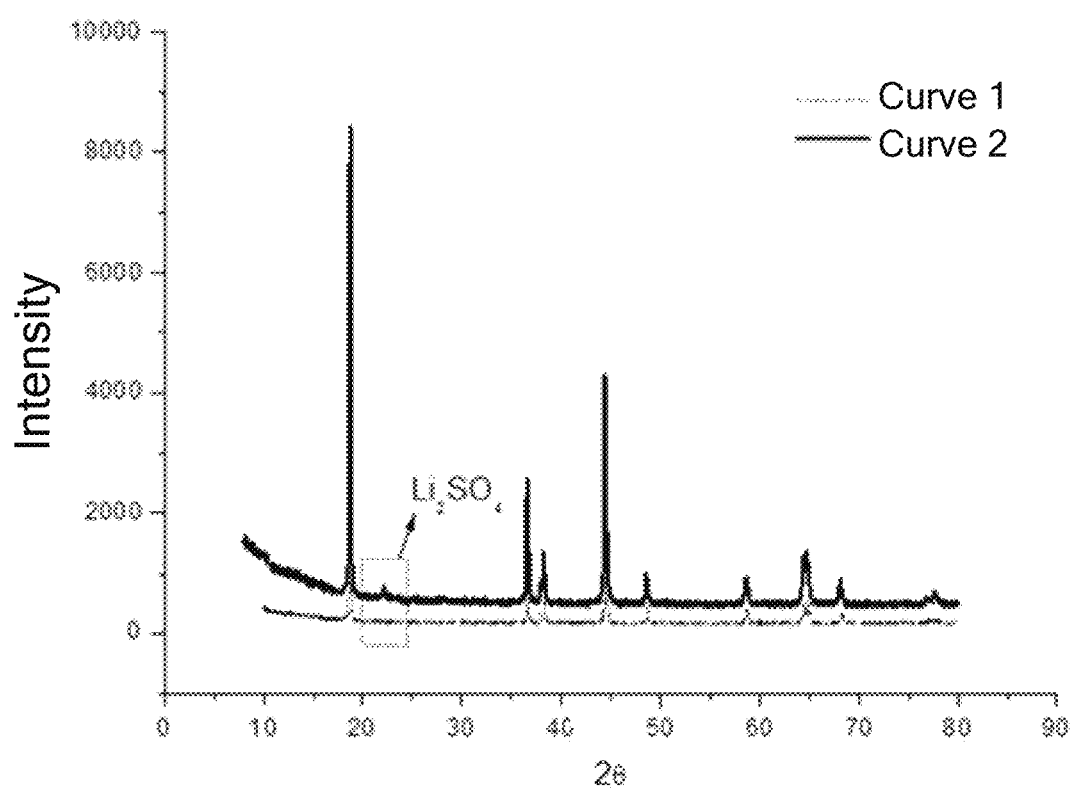
FIG. 1 shows X-ray diffractometry (XRD) patterns of intermediates obtained after single sintering of the modified high-nickel cathode materials in Example 3 and Comparative Example 1.

In order to facilitate the understanding of the present disclosure, the present disclosure is described in detail below in conjunction with the accompanying drawings of the specification and the preferred examples, but the protection scope of the present disclosure is not limited to the following specific examples.

Unless otherwise defined, all technical terms used hereinafter have the same meaning as commonly understood by those skilled in the art. The technical terms used herein are merely for the purpose of describing specific examples, and are not intended to limit the protection scope of the present disclosure.

Unless otherwise specified, various raw materials, reagents, instruments, equipment, and the like used in the present disclosure can be purchased from the market or can be prepared by existing methods.

Example 1

A modified high-nickel cathode material was provided in this example. The modified high-nickel cathode material was a $SO_4^{2-}$-doped modified high-nickel cathode material; a secondary particle of the modified high-nickel cathode material was spherical; $SO_4^{2-}$ was distributed in the secondary particle with a content gradient from high inside to low outside: a $SO_4^{2-}$ content in a spherical region of L<0.6 R was 65% to 70% of a $SO_4^{2-}$ content in the entire secondary particle, where R represented a radius of the spherical secondary particle and L represented a distance from a center of the spherical secondary particle; a $SO_4^{2-}$ content in the modified high-nickel cathode material was 0.1%; and the modified high-nickel cathode material had a chemical composition of $Li_{1.03}Ni_{0.88}Co_{0.1}Al_{0.02}S_{0.003}O_2$.

A preparation method of the modified high-nickel cathode material in this example was provided, including the following steps:

(1) A nickel cobalt aluminum hydroxide, lithium hydroxide, and lithium sulfate were mixed to obtain a mixture (a ratio of a total molar mass of nickel, cobalt, and aluminum to lithium in the mixture was 1:1.04 and a $SO_4^{2-}$ content in the mixture was 0.5%), and the mixture was placed in a furnace with an oxygen atmosphere and sintered at 760° C. for 15 h, (2) A sintered material was dissociated and sieved to obtain a high-nickel lithium nickel cobalt aluminum oxide matrix material.

(3) The matrix material was placed in deionized water and washed for 30 min, a resulting mixture was filtered, and a resulting filter cake was dried in a vacuum drying oven for 12 h and then sieved to obtain a final product with a $SO_4^{2-}$ content of 0.1%, where a mass ratio of the matrix material to the deionized water was 1:1.5.

The cathode material was used to fabricate a button battery with a lithium metal sheet as a negative electrode, and the button battery was charged and discharged at room temperature and 0.1 C in a voltage range of 3.0 V to 4.3 V for evaluation. The unit cell size, S contents before and after water-washing, residual lithium, and initial capacity characteristics of the cathode material were shown in Table 1.

Example 2

A modified high-nickel cathode material was provided in this example. The modified high-nickel cathode material was a $SO_4^{2-}$-doped modified high-nickel cathode material; the modified high-nickel cathode material was composed of spherical secondary particles; $SO_4^{2-}$ was distributed in the secondary particle with aa content gradient from high inside to low outside; a $SO_4^{2-}$ content in a spherical region of L<0.6 R was 70% to 75% of a $SO_4^{2-}$ content in the entire secondary particle, where R represented a radius of the spherical secondary particle and L represented a distance from a center of the spherical secondary particle; a $SO_4^{2-}$ content in the modified high-nickel cathode material was 0.15%; and the modified high-nickel cathode material had a chemical composition of $Li_{1.03}Ni_{0.88}Co_{0.1}Al_{0.02}S_{0.0045}O_2$.

A preparation method of the modified high-nickel cathode material in this example was provided, including the following steps:

(1) A nickel cobalt aluminum hydroxide, lithium hydroxide, and lithium sulfate were mixed to obtain a mixture (a ratio of a total molar mass of nickel, cobalt, and aluminum to lithium in the mixture was 1:1.04 and a $SO_4^{2-}$ content in the mixture was 1.1%), and the mixture was placed in a furnace with an oxygen atmosphere and sintered at 760° C. for 15 h.

(2) A sintered material was dissociated and sieved to obtain a high-nickel lithium nickel cobalt aluminum oxide matrix material.

(3) The matrix material was placed in deionized water and washed for 30 min, a resulting mixture was filtered, and a resulting filter cake was dried in a vacuum drying oven for 12 h and then sieved to obtain a modified high-nickel cathode material with a $SO_4^{2-}$ content of 0.15%, where a mass ratio of the matrix material to the deionized water was 1:1.5.

The cathode material was used to fabricate a button battery with a lithium metal sheet as a negative electrode, and the button battery was charged and discharged at room temperature and 0.1 C in a voltage range of 3.0 V to 4.3 V for evaluation. The unit cell size, S contents before and after water-washing, residual lithium, and initial capacity characteristics of the cathode material were shown in Table 1.

Example 3

A modified high-nickel cathode material was provided in this example. The modified high-nickel cathode material was a $SO_4^{2-}$-doped modified high-nickel cathode material; the modified high-nickel cathode material was composed of spherical secondary particles; $SO_4^{2-}$ was distributed in the secondary particle with a content gradient from high inside to low outside; a $SO_4^{2-}$ content in a spherical region of L<0.6 R was 75% to 80% of a $SO_4^{2-}$, content in the entire secondary particle, where R represented a radius of the spherical secondary particle and L represented a distance from a center of the spherical secondary particle; a $SO_4^{2-}$ content in the modified high-nickel cathode material was 0.4%; and the modified high-nickel cathode material had a chemical composition of $Li_{1.03}Ni_{0.88}Co_{0.1}Al_{0.02}S_{0.012}O_2$.

Figure 2:
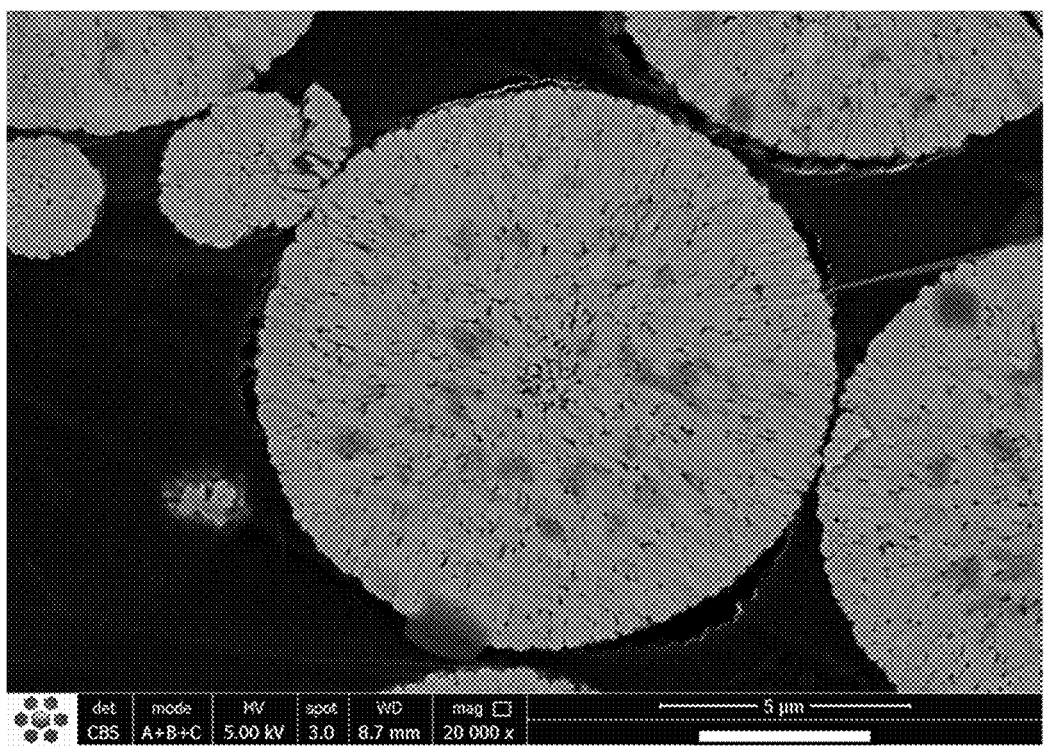
FIG. 2 is a scanning electron microscopy (SEM) image of a cross section of an intermediate obtained after single sintering of the modified high-nickel cathode material in Example 3.
Figure 3:
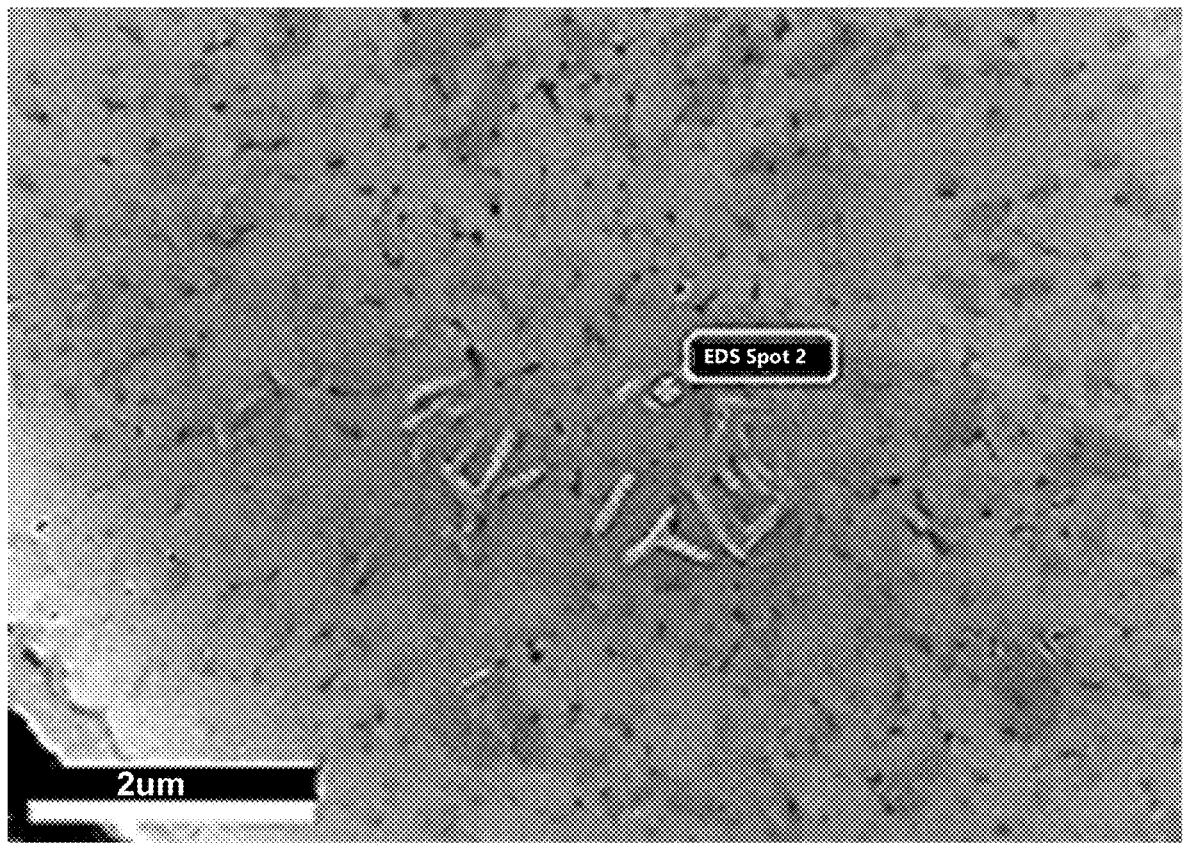
FIG. 3 is an electron microscope (EM) image of a middle of a cross section of a secondary particle of an intermediate obtained after single sintering of the modified high-nickel cathode material in Example 3.
Figure 4:
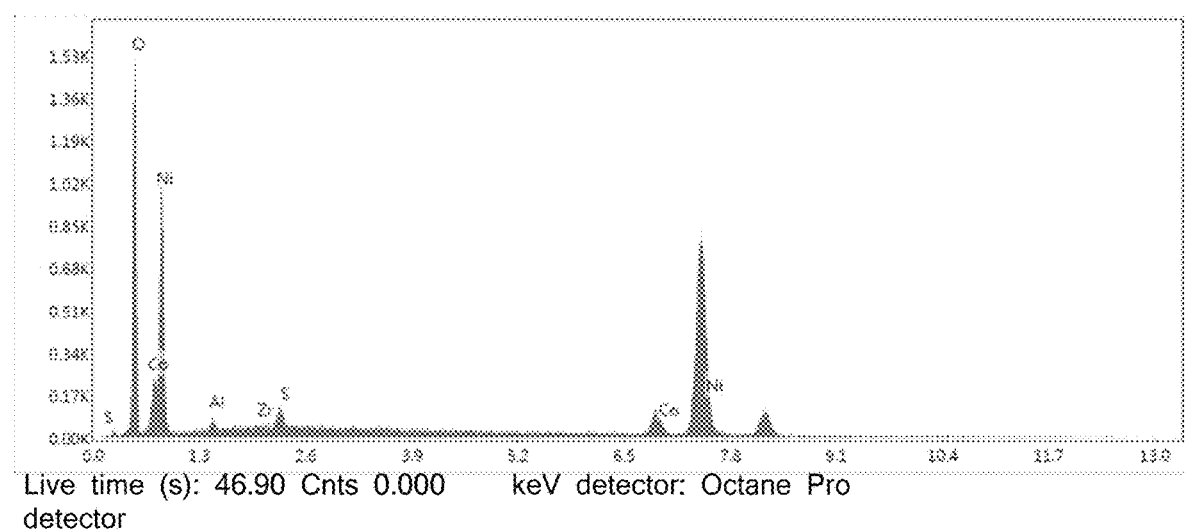
FIG. 4 is an energy-dispersive X-ray spectroscopy (EDS) spectrum of a middle of a cross section of a secondary particle of an intermediate obtained after single sintering of the modified high-nickel cathode material in Example 3.
Figure 5:
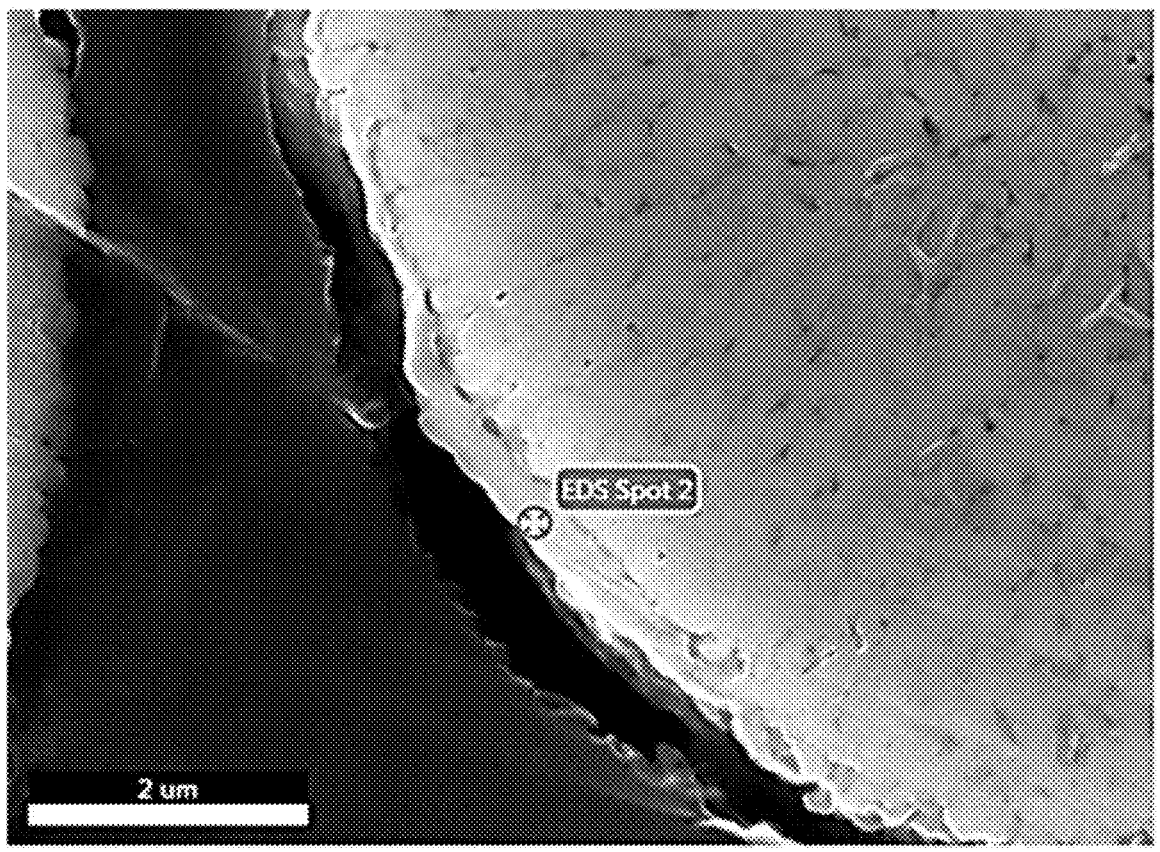
FIG. 5 is an EM image of an edge of a cross section of a secondary particle of an intermediate obtained after single sintering of the modified high-nickel cathode material in Example 3.
Figure 6:
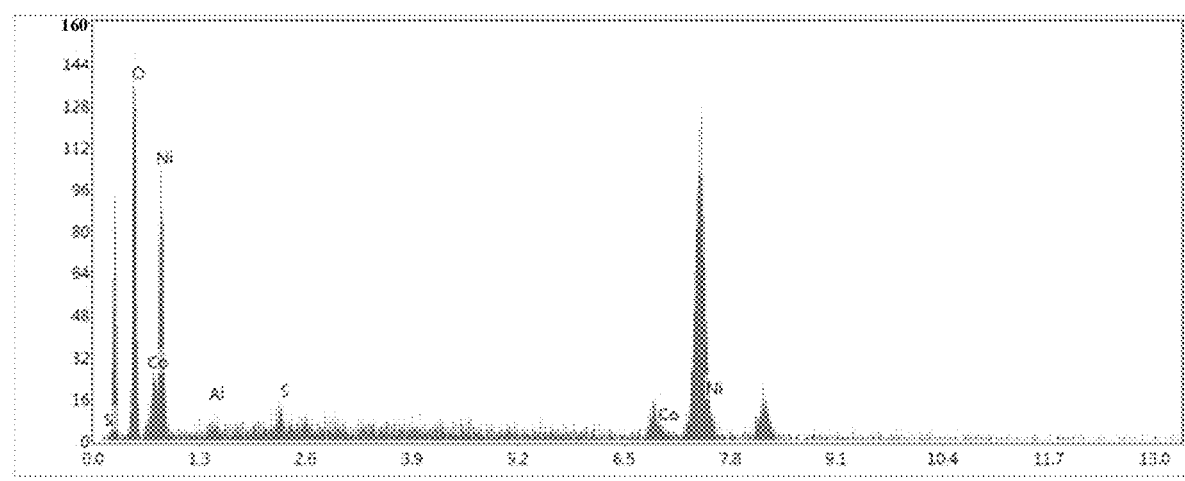
FIG. 6 is an EDS spectrum of an edge of a cross section of a secondary particle of an intermediate obtained after single sintering of the modified high-nickel cathode material in Example 3.

A preparation method of the modified high-nickel cathode material in this example was provided, including the following steps:

(1) A nickel cobalt aluminum hydroxide, lithium hydroxide, and lithium sulfate were mixed to obtain a mixture (a ratio of a total molar mass of nickel, cobalt, and aluminum to lithium in the mixture was 1:1.04 and a $SO_4^{2-}$ content in the mixture was 2.7%), and the mixture was placed in a furnace with an oxygen atmosphere and sintered at 760° C. for 15 h, (2) A sintered material was dissociated and sieved to obtain a high-nickel lithium nickel cobalt aluminum oxide matrix material. The obtained high-nickel matrix material was tested by a D8 ADVANCE X-ray diffractometer to obtain curve 2 in FIG. 1, and a diffraction peak of $Li_2SO_4$ appeared at a diffraction angle of about 22.15°, The high-nickel matrix material was characterized by SEM and EDS, and characterization results were shown in FIG. 2, FIG. 3. FIG. 4, FIG. 5, and FIG. 6. FIG. 2 shows that the primary particles are small and porous after the $SO_4^{2-}$-doping; and FIG. 3, FIG. 4. FIG. 5, and FIG. 6 show that there is a specified amount of $SO_4^{2-}$ inside and outside the secondary particles.

(3) The matrix material was placed in deionized water and washed for 30 min, a resulting mixture was filtered, and a resulting filter cake was dried in a vacuum drying oven for 12 h and then sieved to obtain a modified high-nickel cathode material with a $SO_4^{2-}$ content of 0.4%, where a mass ratio of the matrix material to the deionized water was 1:1.5.

Figure 7:
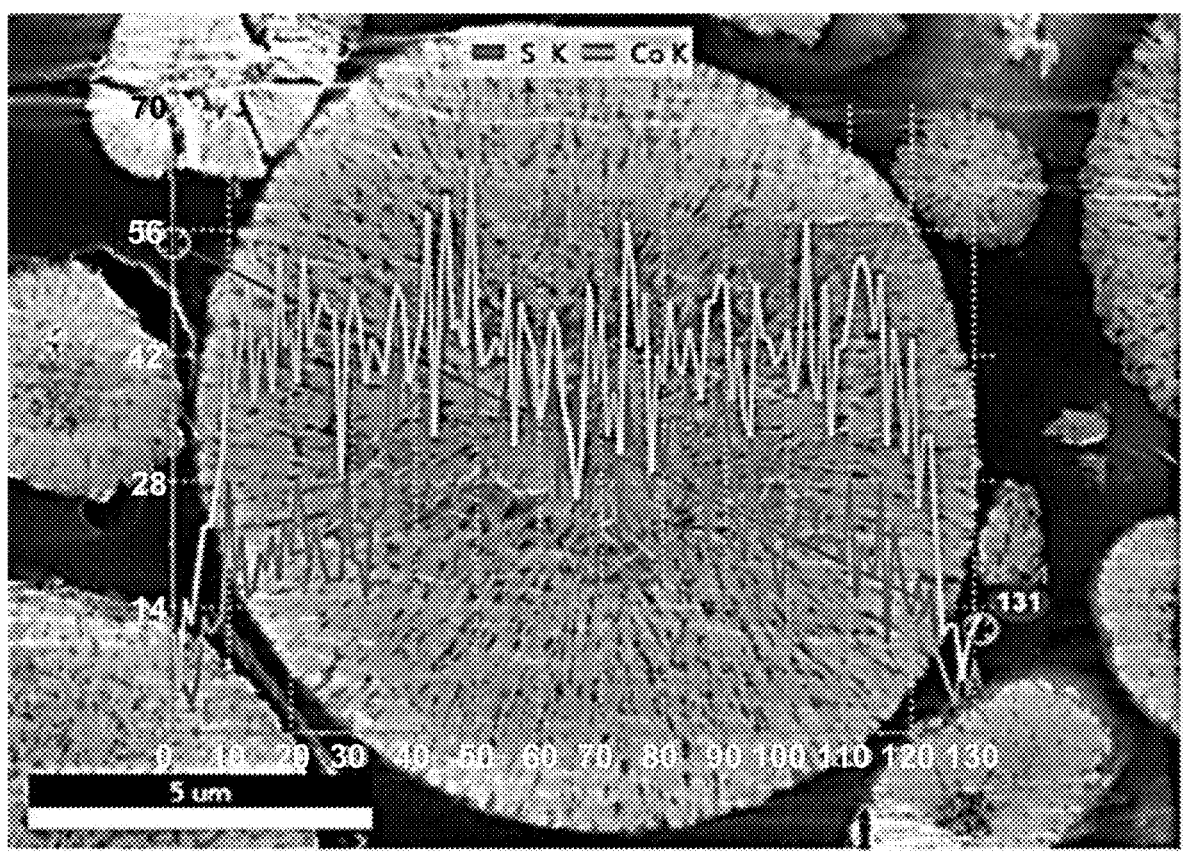
FIG. 7 is an EDS spectrum of a cross section of a secondary particle of a finished product obtained after water-washing of the modified high-nickel cathode material in Example 3.

The modified high-nickel cathode material was characterized by EDS, and characterization results were shown in FIG. 7. The results show that, in the material obtained after the water-washing and drying, $SO_4^{2-}$ is distributed in the secondary particle with a content gradient from high inside to low outside, indicating that the water-washing removes most of the $SO_4^{2-}$ on the surface. A $SO_4^{2-}$ content in a spherical region of L<0.6 R was about 60% to 80% of a $SO_4^{2-}$ content in the entire secondary particle, where R represented a radius of the spherical secondary particle and L represented a distance from a center of the spherical secondary particle.

The modified cathode material was used to fabricate a button battery with a lithium metal sheet as a negative electrode, and the button battery was charged and discharged at room temperature and 0.1 C in a voltage range of 3.0 V to 4.3 V for evaluation. The unit cell size, S contents before and after water-washing, residual lithium, and initial capacity characteristics of the cathode material were shown in Table 1.

Example 4

A modified high-nickel cathode material was provided in this example. The modified high-nickel cathode material was a $SO_4^{2-}$ doped modified high-nickel cathode material: the modified high-nickel cathode material was composed of spherical secondary particles; $SO_4^{2-}$ was distributed in the secondary particle with a content gradient from high inside to low outside: a $SO_4^{2-}$ content in a spherical region of L<0.6 R was 70% to 75% of a $SO_4^{2-}$ content in the entire secondary particle, where R represented a radius of the spherical secondary particle and L represented a distance from a center of the spherical secondary particle; a $SO_4^{2-}$ content in the modified high-nickel cathode material was 0.15%; and the modified high-nickel cathode material had a chemical composition of $Li_{1.03}Ni_{0.88}Co_{0.1}Al_{0.02}S_{0.0045}O_2$.

A preparation method of the modified high-nickel cathode material in this example was provided, including the following steps:

(1) A nickel cobalt aluminum hydroxide, lithium hydroxide, and cobalt sulfate were mixed to obtain a mixture (a ratio of a total molar mass of nickel, cobalt, and aluminum to lithium in the mixture was 1:1.04 and a $SO_4^{2-}$ content in the mixture was 1.1%), and the mixture was placed in a furnace with an oxygen atmosphere and sintered at 760° C. for 15 h.

(2) A sintered material was dissociated and sieved to obtain a high-nickel lithium nickel cobalt aluminum oxide matrix material.

(3) The matrix material was placed in deionized water and washed for 30 min, a resulting mixture was filtered, and a resulting filter cake was dried in a vacuum drying oven for 12 h and then sieved to obtain a final product with a Sot content of 0.15%, where a mass ratio of the matrix material to the deionized water was 1:1.5.

The cathode material was used to fabricate a button battery with a lithium metal sheet as a negative electrode, and the button battery was charged and discharged at room temperature and 0.1 C in a voltage range of 3.0 V to 4.3 V for evaluation. The unit cell size, S contents before and after water-washing, residual lithium, and initial capacity characteristics of the cathode material were shown in Table 1.

Comparative Example 1

A preparation method of a high-nickel cathode material was provided in this comparative example, including the following steps:
(1) A nickel cobalt aluminum hydroxide and lithium hydroxide were mixed to obtain a mixture (a ratio of a total molar mass of nickel, cobalt, and aluminum to lithium in the mixture was 1:1.04), and the mixture was placed in a furnace with an oxygen atmosphere and sintered at 760° C. for 15 h.
(2) A sintered material was dissociated and sieved to obtain a high-nickel lithium nickel cobalt aluminum oxide matrix material $Li_{1.03}Ni_{0.88}Co_{0.1}Al_{0.02}O_2$. The obtained matrix material was tested by a D8 ADVANCE X-ray diffractometer to obtain curve 1 in FIG. 1, and except for characteristic peaks of NCA, no other impurity peaks appeared.
(3) The matrix material was placed in deionized water and washed for 30 min, a resulting mixture was filtered, and a resulting filter cake was dried in a vacuum drying oven for 12 h and then sieved to obtain a high-nickel cathode material with a $SO_4^{2-}$ content of 0.06%, where a mass ratio of the matrix material to the deionized water was 1:1.5 (Due to limitations of a preparation process for the precursor, there was a small amount of $SO_4^{2-}$ in the product).

Figure 8:
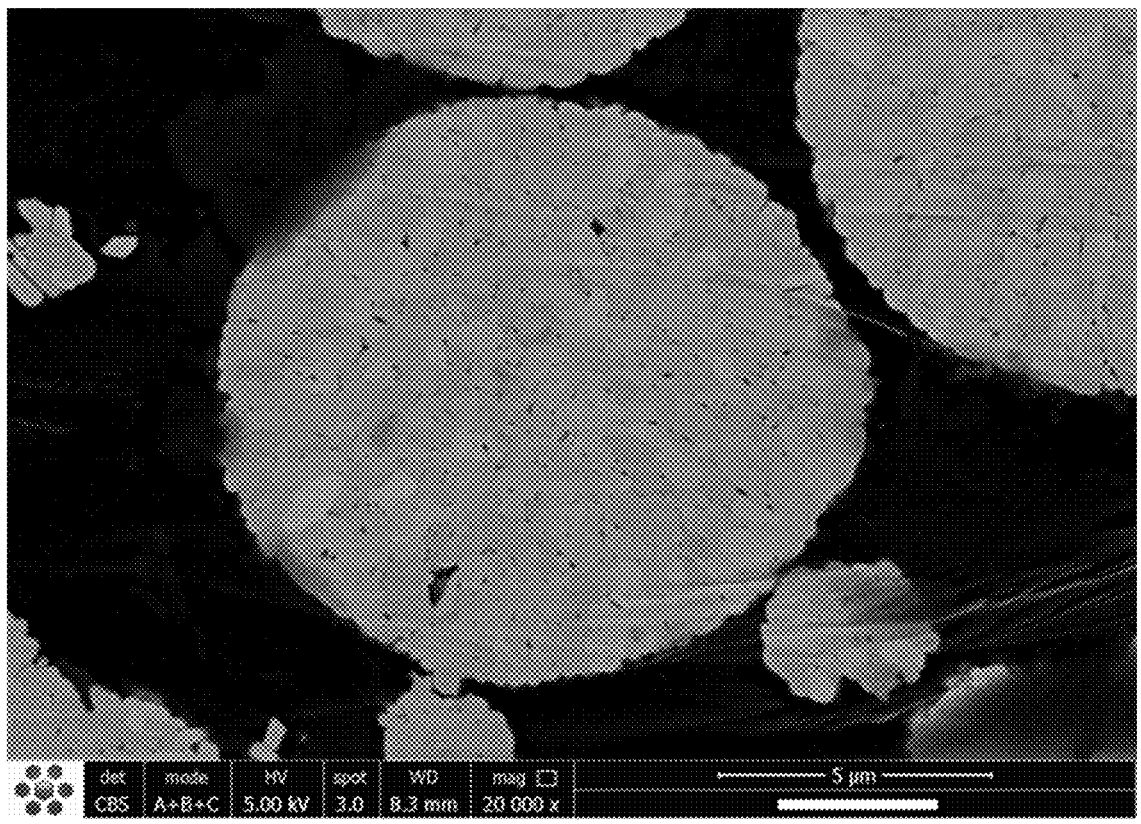
FIG. 8 is an SEM image of a cross section of an intermediate obtained after single sintering of the modified high-nickel cathode material in Comparative Example 1.

The obtained high-nickel cathode material was characterized by SEM, and characterization results were shown in FIG. 8. It can be seen from the figure that the primary particles are larger than that in FIG. 2 and have less pores.

The cathode material was used to fabricate a button battery with a lithium metal sheet as a negative electrode, and the button battery was charged and discharged at room temperature and 0.1 C in a voltage range of 3.0 V to 4.3 V for evaluation. The unit cell size, S contents before and after water-washing, residual lithium, and initial capacity characteristics of the cathode material were shown in Table 1.

Comparative Example 2

A preparation method of a modified high-nickel cathode material was provided in this comparative example, including the following steps:
(1) A nickel cobalt aluminum hydroxide, lithium hydroxide, and lithium sulfate were mixed to obtain a mixture (a ratio of a total molar mass of nickel, cobalt, and aluminum to lithium in the mixture was 1:1.04 and a $SO_4^{2-}$ content in the mixture was 4.2%), and the mixture was placed in a furnace with an oxygen atmosphere and sintered at 760° C. for 15 h.
(2) A sintered material was dissociated and sieved to obtain a high-nickel lithium nickel cobalt aluminum oxide matrix material $Li_{1.03}Ni_{0.88}Co_{0.1}Al_{0.02}O_2$.
(3) The matrix material was placed in deionized water and washed for 30 min, a resulting mixture was filtered, and a resulting filter cake was dried in a vacuum drying oven for 12 h and then sieved to obtain a final product with a $SO_4^{2-}$ content of 0.5%, where a mass ratio of the matrix material to the deionized water was 1:1.5, The cathode material was used to fabricate a button battery with a lithium metal sheet as a negative electrode, and the button battery was charged and discharged at room temperature and 0.1 C in a voltage range of 3.0 V to 4.3 V for evaluation. The unit cell size, S contents before and after water-washing, residual lithium, and initial capacity characteristics of the cathode material were shown in Table 1.

Comparative Example 3

A preparation method of a modified high-nickel cathode material was provided in this comparative example, including the following steps:
(1) A nickel cobalt aluminum hydroxide and lithium hydroxide were mixed to obtain a mixture (a ratio of a total molar mass of nickel, cobalt, and aluminum to lithium in the mixture was 1:1.04), and the mixture was placed in a furnace with an oxygen atmosphere and sintered at 710° C. for 15 h.
(2) A sintered material was dissociated and sieved to obtain a high-nickel lithium nickel cobalt aluminum oxide matrix material $Li_{1.03}Ni_{0.88}Co_{0.1}Al_{0.02}O_2$
(3) The matrix material was placed in deionized water and washed for 30 min, a resulting mixture was filtered, and a resulting filter cake was dried in a vacuum drying oven for 12 h and then sieved to obtain a final product with a $SO_4^{2-}$ content of 0.06%, where a mass ratio of the matrix, material to the deionized water was 1:1.5.

The cathode material was used to fabricate a button battery with a lithium metal sheet as a negative electrode, and the button battery was charged and discharged at room temperature and 0.1 C in a voltage range of 3.0 V to 4.3 V for evaluation. The unit cell size, S contents before and after water-washing, residual lithium, and initial capacity characteristics of the cathode material were shown in Table 1.

Comparative Example 4

A preparation method of a modified high-nickel cathode material was provided in this comparative example, including the following steps:
(1) A nickel cobalt aluminum hydroxide, lithium hydroxide, and lithium sulfate were mixed to obtain a mixture (a ratio of a total molar mass of nickel, cobalt, and aluminum to lithium in the mixture was 1:1.04 and a $SO_4^{2-}$ content in the mixture was 0.15%), and the mixture was placed in a furnace with an oxygen atmosphere and sintered at 740° C. for 15 h.
(2) The sintered material was dissociated and sieved to obtain a high-nickel lithium nickel cobalt aluminum oxide product with a $SO_4^{2-}$ content of 0.4%. Since the finally prepared product was not subjected to water-washing, $SO_4^{2-}$ was evenly distributed in the secondary particle.

The modified high-nickel cathode material was used to fabricate a button battery with a lithium metal sheet as a negative electrode, and the button battery was charged and discharged at room temperature and 0.1 C in a voltage range of 3.0 V to 4.3 V for evaluation. The unit cell size, S contents before and after water-washing, residual lithium, and initial capacity characteristics of the cathode material were shown in Table 1.

TABLE 1

Performance of the modified high-nickel cathode materials prepared in the examples and comparative examples

| | Single-sintering product (lithium nickel cobalt aluminum oxide matrix material) | | | | Water-washing and drying | | | Before and after water-washing | Final product |
|---|---|---|---|---|---|---|---|---|---|
| Example | Unit cell size, nm | Residual lithium, ppm | $SO_4^{2-}$ content, % | Initial capacity, mAh/g | Residual lithium, ppm | $SO_4^{2-}$ content, % | Initial capacity, mAh/g | Capacity improvement, mAh/g | Initial capacity, mAh/g |
| Example 1 | 190 | 2722 | 0.5 | 204.7 | 1160 | 0.1 | 215.9 | 10.2 | 215.9 |
| Example 2 | 175 | 2870 | 1.1 | 204.2 | 1186 | 0.15 | 215 | 10.8 | 215 |
| Example 3 | 157 | 3137 | 2.7 | 206.9 | 1338 | 0.4 | 217.6 | 10.7 | 217.6 |
| Example 4 | 173 | 3905 | 1.1 | 204.5 | 1174 | 0.15 | 215.2 | 10.7 | 215:2 |
| Comparative Example 1 | 220 | 2708 | 0.24 | 204 | 1095 | 0.06 | 209.3 | 5.3 | 209.3 |
| Comparative Example 2 | 132 | 2163 | 4.2 | 180.8 | 1180 | 0.5 | 197.3 | 16.5 | 197.3 |
| Comparative Example 3 | 188 | 3070 | 0.24 | 203.6 | 1089 | 0.06 | 208.6 | 5 | 208.6 |
| Comparative Example 4 | 161 | 2988 | 0.4 | 203.8 | — | — | — | — | 203.8 |

It can be seen from Table 1 that a SOP content before sintering is controlled in a range of 0.5% to 27%, a SOP content after the water-washing and drying is in a range of 0.1% to 0.4%, and the modified high-nickel cathode material has a unit cell size of 150 nm to 200 nm, such that the modified high-nickel cathode material has a high initial capacity of 215 mAh/g or more.

It can be seen from Example 1 and Comparative Examples 1 and 2 that, when an amount of $SO_4^{2-}$ added in the single sintering is too low, the capacity improvement after the water-washing is not significant, and an initial capacity of the final product is 5 mAh/g or more lower than the technical solution of the present disclosure; and when an amount of $SO_4^{2-}$ added in the single sintering is too high, a unit cell size is reduced too much, thereby affecting the normal capacity.

It can be seen from Comparative Example 3 and Example 1 that, when the obtained cathode materials have relatively similar grain sizes, the material doped with $SO_4^{2-}$ by the preparation method of the present disclosure undergoes larger capacity improvement after the water-washing than the material not doped with $SO_4^{2-}$, and the final product has a higher initial capacity.

It can be seen from Comparative Example 4 and Example 3 that, when the final products have relatively similar grain sizes and consistent $SO_4^{2-}$ contents, the electrochemical performance of the cathode material with a $SO_4^{2-}$ content decreasing from inside to outside has obvious advantages over the electrochemical performance of the cathode material with $SO_4^{2-}$ uniformly distributed, which is mainly reflected in the high initial capacity.

What is claimed is:

1. A modified high-nickel cathode material, wherein the modified high-nickel cathode material is a $SO_4^{2-}$-doped modified high-nickel cathode material, and $SO_4^{2-}$ is distributed in a secondary particle of the modified high-nickel cathode material with a content gradient from high inside to low outside, wherein the modified high-nickel cathode material has a chemical formula of $Li_xNi_yCo_{(1-y-z)}M_zS_\gamma O_2$, wherein $0.98 \leq x \leq 1.1$, $0.8 \leq y \leq 1$, $0 \leq z \leq 0.2$, $0.003 \leq \gamma \leq 0.15$, and M is Al or Mn.

2. The modified high-nickel cathode material according to claim 1, wherein the secondary particle of the modified high-nickel cathode material is spherical; and a $SO_4^{2-}$ content in a spherical region of $L<0.6$ R is 60% to 80% of a $SO_4^{2-}$ content in the entire secondary particle and a $SO_4^{2-}$ content in an annular region of $0.6 R \leq L \leq R$ is 20% to 40% of the $SO_4^{2-}$ content in the entire secondary particle, wherein R represents a radius of the spherical secondary particle and L represents a distance from a center of the spherical secondary particle.

3. The modified high-nickel cathode material according to claim 1, wherein the modified high-nickel cathode material has a unit cell size of 150 nm to 200 nm.

4. A preparation method of the modified high-nickel cathode material according to claim 1, comprising the following steps:
   (1) mixing a high-nickel cathode material precursor, a lithium source, and a sulfate, and sintering a resulting mixture to obtain a matrix material; and
   (2) water-washing and drying the matrix material to obtain the modified high-nickel cathode material.

5. The preparation method according to claim 4, wherein in step (1), an addition amount of the sulfate is calculated based on $SO_4^{2-}$, and a mass of the $SO_4^{2-}$ is 0.5% to 2.7% of a total mass of the mixture.

6. The preparation method according to claim 5, wherein in step (1), the sintering is conducted at 600° C. to 900° C. for 3 h to 20 h.

7. The preparation method according to claim 5, wherein in step (2), during the water-washing, a mass ratio of the matrix material to deionized water is (1:0.5) to (1:5).

8. The preparation method according to claim 7, wherein in step (2), during the water-washing, the water-washing is conducted for 20 min to 40 min.

9. The preparation method according to claim 4, wherein in step (1), the sulfate is one or more selected from the group consisting of nickel sulfate, cobalt sulfate, aluminum sulfate, lithium sulfate, sodium sulfate, and ammonium sulfate.

10. The preparation method according to claim 5, wherein in step (1), the sintering is conducted at 600° C. to 900° C. for 3 h to 20 h.

11. The preparation method according to claim 4, wherein in step (2), during the water-washing, a mass ratio of the matrix material to deionized water is (1:0.5) to (1:5).

12. The preparation method according to claim 11, wherein in step (2), during the water-washing, the water-washing is conducted for 20 min to 40 min.

13. The preparation method according to claim 4, wherein the secondary particle of the modified high-nickel cathode material is spherical; and a $SO_4^{2-}$ content in a spherical region of $L<0.6\,R$ is 60% to 80% of a $SO_4^{2-}$ content in the entire secondary particle and a $SO_4^{2-}$ content in an annular region of $0.6\,R \leq L \leq R$ is 20% to 40% of the $SO_4^{2-}$ content in the entire secondary particle, wherein R represents a radius of the spherical secondary particle and L represents a distance from a center of the spherical secondary particle.

14. The preparation method according to claim 4, wherein the modified high-nickel cathode material has a unit cell size of 150 nm to 200 nm.

* * * * *